United States Patent
Ishihara

(10) Patent No.: US 12,130,181 B2
(45) Date of Patent: Oct. 29, 2024

(54) TERMINAL DEVICE, COLORIMETER, NON-TRANSITORY COMPUTER-READABLE STORAGE MEDIUM STORING PROGRAM, AND METHOD OF PROCESSING

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 202 days.

(21) Appl. No.: 18/049,679

(22) Filed: Oct. 26, 2022

(65) Prior Publication Data
US 2023/0133853 A1    May 4, 2023

(30) Foreign Application Priority Data

Oct. 29, 2021   (JP) .................................. 2021-177283

(51) Int. Cl.
*G01J 3/50*    (2006.01)
*G01J 3/02*    (2006.01)
*G09G 5/02*    (2006.01)

(52) U.S. Cl.
CPC ............. *G01J 3/506* (2013.01); *G01J 3/0291* (2013.01); *G09G 5/02* (2013.01)

(58) Field of Classification Search
CPC .. G01J 3/506; G01J 3/0291; G01J 3/50; G01J 3/0264; G01J 3/0272; G01J 3/46; G01J 3/02; G09G 2340/06; G06F 3/147
See application file for complete search history.

(56) References Cited

U.S. PATENT DOCUMENTS

| | | | |
|---|---|---|---|
| 2005/0270301 A1* | 12/2005 | Kitazawa | H04N 1/6055 345/590 |
| 2014/0009485 A1* | 1/2014 | Asanuma | G09G 5/02 345/590 |
| 2021/0352270 A1* | 11/2021 | Bodner | G01J 3/2823 |

FOREIGN PATENT DOCUMENTS

| | | | |
|---|---|---|---|
| JP | 2005-061926 A | | 3/2005 |
| JP | 2011-141253 A | | 7/2011 |
| JP | 2017146525 A | * | 8/2017 |

\* cited by examiner

*Primary Examiner* — Jeffery A Brier
(74) *Attorney, Agent, or Firm* — WORKMAN NYDEGGER

(57) ABSTRACT

A terminal device includes a communication section configured to communicate with a colorimeter including a colorimeter display section, and a processing section configured to perform display processing on a terminal display section, wherein the processing section performs determination processing as to whether to display a color of a color measurement result produced by the colorimeter both on the colorimeter display section and the terminal display section or display the color only on the terminal display section based on a distance from the colorimeter.

14 Claims, 11 Drawing Sheets

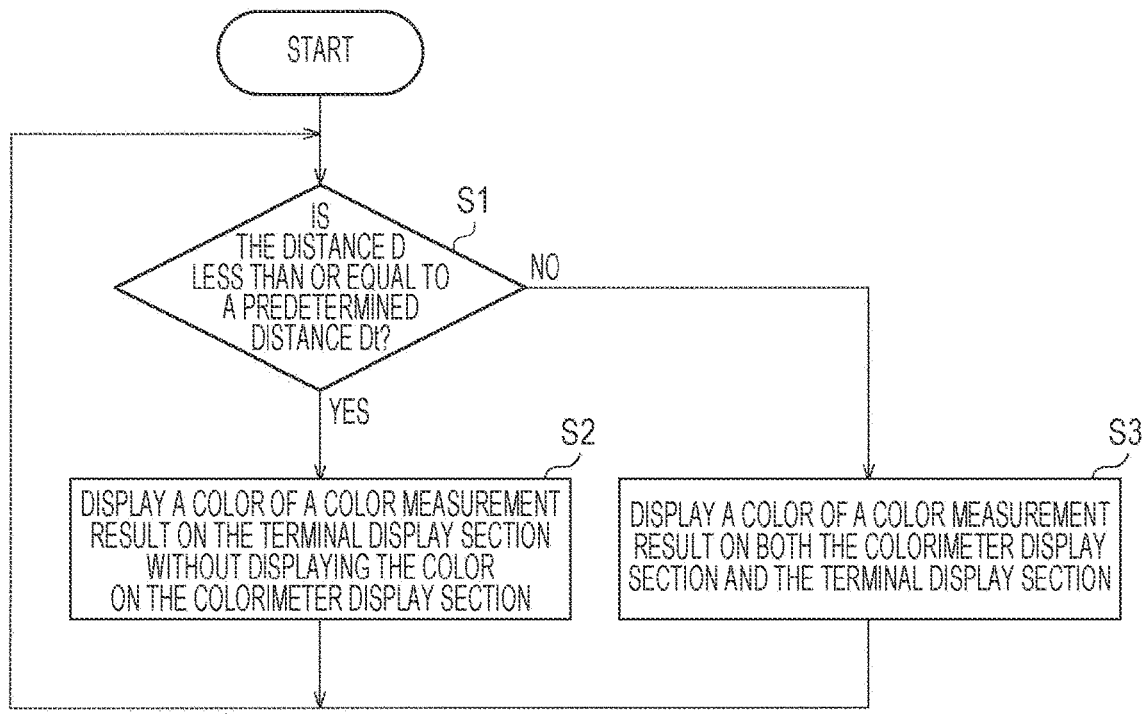

TERMINAL DEVICE, COLORIMETER, NON-TRANSITORY COMPUTER-READABLE STORAGE MEDIUM STORING PROGRAM, AND METHOD OF PROCESSING

The present application is based on, and claims priority from JP Application Serial Number 2021-177283, filed Oct. 29, 2021, the disclosure of which is hereby incorporated by reference herein in its entirety.

BACKGROUND

1. Technical Field

The present disclosure relates to a terminal device, a colorimeter, a non-transitory computer-readable storage medium storing a program, and a method of processing.

2. Related Art

JP-A-2011-141253 discloses a color measurement method by which a color patch having an abnormal color measurement value is reliably detected. In the color measurement method, color measurement is performed by a computer including a chart image display section that displays a color measurement result of a color patch on a color chart in a superposed manner, a comparison determination section that compares a color measurement result with a reference value, a warning section that displays a warning of abnormality of the color measurement result by blinking on the color chart, and a correction section that performs again color measurement of a color patch determined as abnormal so as to correct the color measurement result.

JP-A-2011-141253 discloses a color measurement device that displays warning information on a computer screen by blinking as a color measurement device that prevents a user from overlooking an abnormal color patch. When the color measurement device disclosed by JP-A-2011-141253 is used, by providing a colorimeter with a display section separately from the computer screen and displaying a color of a color measurement result on the display section, it is possible to further improve user convenience. However, it was identified that in this case, there is a problem in that when the computer screen and the display section of the colorimeter have different color reproducibilities, the user might operate the colorimeter mistakenly.

SUMMARY

According to an aspect of the present disclosure, there is provided a terminal device including: a communication section configured to communicate with a colorimeter including a colorimeter display section; and a processing section configured to perform display processing on a terminal display section, wherein the processing section performs determination processing as to whether to display a color of a color measurement result produced by the colorimeter both on the colorimeter display section and the terminal display section or display the color only on the terminal display section based on a distance from the colorimeter.

According to another aspect of the present disclosure, there is provided a colorimeter including: a color measurement section configured to perform color measurement; a colorimeter communication section configured to communicate with a terminal device; a colorimeter display section; and a colorimeter processing section configured to perform display processing of the colorimeter display section, wherein when communication between the colorimeter communication section and the terminal device is not established, the colorimeter processing section displays a color of a measurement result on the colorimeter display section, whereas when communication between the colorimeter communication section and the terminal device is established, the colorimeter processing section determines whether or not to display the color of the measurement result on the colorimeter display section based on the instruction information of display prohibited or display permitted from the terminal device.

According to still another aspect of the present disclosure, there is provided a non-transitory computer-readable storage medium storing a program, the program causing a computer to perform functions including: a communication section configured to communicate with a colorimeter including a colorimeter display section; and a processing section configured to perform display processing on a terminal display section, wherein the processing section performs determination processing as to whether to display a color of a color measurement result produced by the colorimeter both on the colorimeter display section and the terminal display section or display the color only on the terminal display section based on a distance from the colorimeter.

According to still another aspect of the present disclosure, there is provided a processing method including: communicating with a colorimeter including a colorimeter display section; displaying on a terminal display section; and determining whether to display a color of a color measurement result produced by the colorimeter both on the colorimeter display section and the terminal display section or display the color only on the terminal display section based on a distance from the colorimeter.

BRIEF DESCRIPTION OF THE DRAWINGS

FIG. 5 is a flowchart illustrating an example of the processing according to the present embodiment.

FIG. 6 is an example of the data structure of a beacon signal.

DESCRIPTION OF EXEMPLARY EMBODIMENTS

In the following, a description will be given of the present embodiment. In this regard, the embodiment described below does not unreasonably restrict the contents described in the scope of the appended claims. Also, all the components described in the present embodiment are not necessarily mandatory components.

1. Terminal Device

Figure 1:
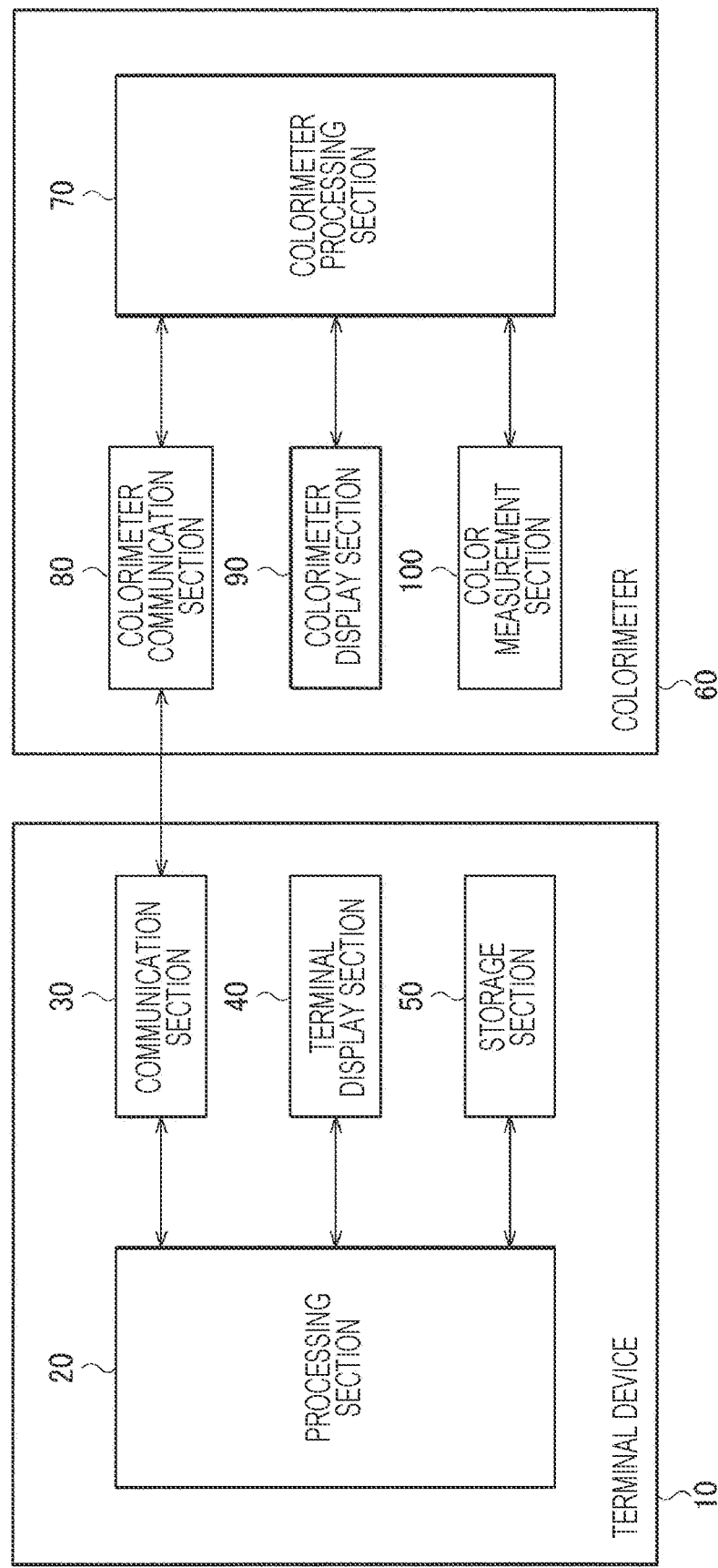
FIG. 1 is an example of the configurations of a terminal device and a colorimeter according to the present embodiment.

FIG. 1 illustrates an example of the configuration of a terminal device 10 according to the present embodiment. FIG. 1 also illustrates an example of the configuration of a colorimeter 60. The terminal device 10 includes a communication section 30, a terminal display section 40, and a processing section 20. The terminal device 10 is a separate device from the colorimeter 60. It is possible to assume that the terminal device 10 is, for example, a smart device, such as a smartphone, a tablet terminal or the like, a wearable terminal, such as a smart watch, smart glasses or the like, or a personal computer or the like.

The communication section 30 performs communication with an external device, such as the colorimeter 60, and the like in a wired or wireless manner. Specifically, the processing section 20 performs communication control processing, such as information transmission processing, information reception processing, and the like on the communication section 30 so that the communication section 30 transmits information to the colorimeter 60, and the like, and receives information from the colorimeter 60, and the like. It is possible to realize the communication section 30, for example, by a communication IC (integrated circuit), such as a communication ASIC or a communication processor, or the like, or communication firmware, or the like.

The terminal display section 40 displays various kinds of information. For example, it is possible for the terminal display section 40 to display the information received by the terminal device 10 from the colorimeter 60. Also, the terminal display section 40 is an operation interface from which user operation information is input. The terminal display section 40 is, for example, a touch panel, and thus it is possible for a user to perform various operation by touching the terminal display section 40, which is a touch panel. It is possible to realize the terminal display section 40 by various displays, for example, a liquid crystal display using a touch panel method, an organic EL display, or the like.

The storage section 50 stores various kinds of information, for example, a program, data, and the like. The storage section 50 functions as work areas of, for example, the processing section 20 and the communication section 30. It is possible to realize the storage section 50, for example, by a semiconductor memory, such as an SRAM (static random access memory), a DRAM (dynamic random access memory), a flash memory, or the like, a register, a hard disk device, or the like, or the combination of these.

The processing section 20 performs control processing on the terminal device 10. The processing section 20 performs various kinds of control processing on the operation of the terminal device 10, for example, control processing on the communication state of the communication section 30, control processing on the display of the terminal display section 40, and the like. It is possible to realize the processing section 20 by a logic circuit produced by an automatic placement and routing method, for example, a gate array or the like, or by various processors, such as a microcomputer, or the like.

The colorimeter 60 performs color measurement. The colorimeter 60 includes a colorimeter communication section 80, a color measurement section 100, a colorimeter display section 90, and a colorimeter processing section 70.

The color measurement section 100 performs color measurement on a color measurement target, for example, printed matter, or the like, and outputs a color measurement value, which is a color measurement result. It is possible to realize the color measurement section 100 by a color measurement sensor, for example, a spectroscopic sensor, an image sensor, or the like.

The colorimeter display section 90 displays various kinds of information to a user. Specifically, the colorimeter display section 90 displays a color based on the color information measured by the color measurement section 100, and displays the information necessary for the user to operate the colorimeter 60, various kinds of status information on the colorimeter 60, and the like. It is possible to realize the colorimeter display section 90 by various displays, for example, a liquid crystal display, an organic EL display, or the like.

The colorimeter processing section 70 performs control processing on the colorimeter 60. That is to say, various kinds of control processing on the operation of the colorimeter 60, for example, the control processing on the colorimeter communication section 80, the control processing on the color measurement section 100, the control processing on the display of the colorimeter display section 90, and the like. It is possible to realize the colorimeter processing section 70 by a processor that operates based on information, such as a program, and the like, and a memory that stores the information on the program, and the like.

The colorimeter communication section 80 performs communication with an external device, such as the terminal device 10, and the like in a wired or wireless manner. It is possible to realize the colorimeter communication section 80, for example, by a communication IC (integrated circuit), such as a communication ASIC, a communication processor, or the like, communication firmware, or the like. In the present embodiment, the colorimeter processing section 70 performs communication control processing, such as information transmission processing, reception processing, or the like on the colorimeter communication section 80 so that the colorimeter communication section 80 transmits information to an external device, such as the terminal device 10, or the like, or receives information from that device. It is possible to realize the colorimeter communication section 80 by a communication IC (integrated circuit), or the like in the same manner as the communication section 30 of the terminal device 10.

Figure 2:
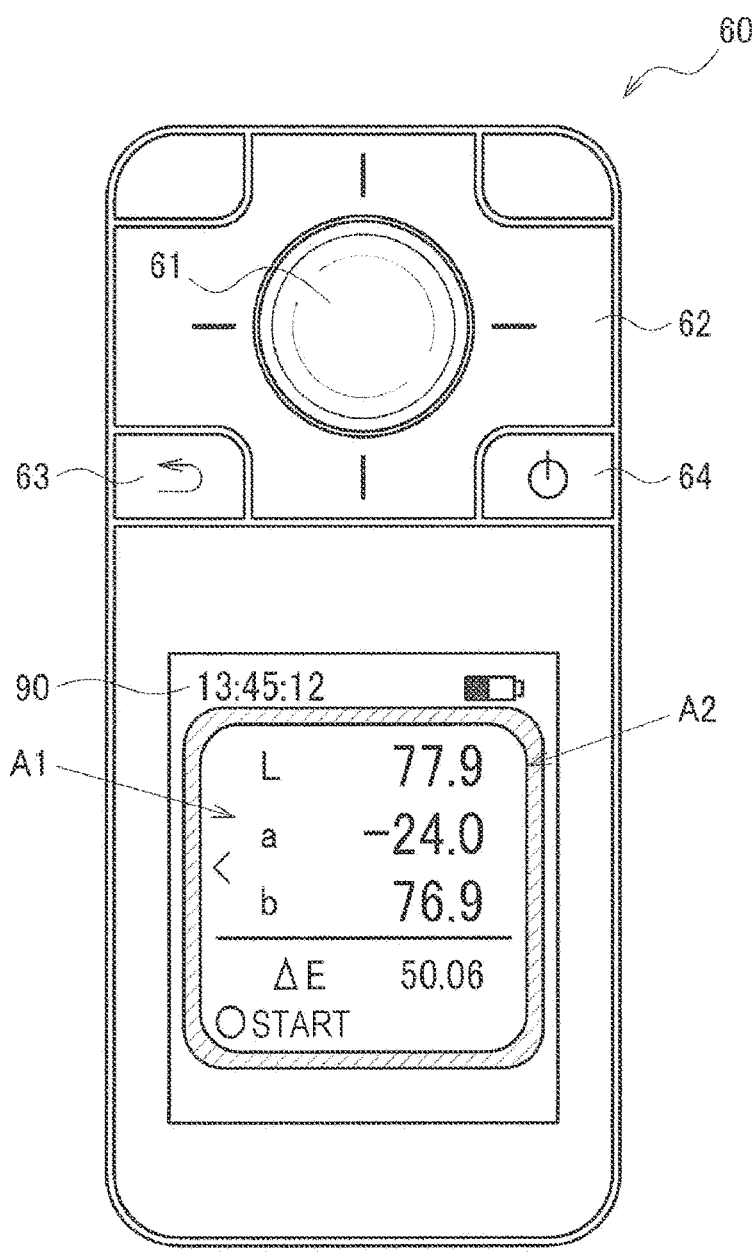
FIG. 2 is an explanatory diagram of the operation buttons and the colorimeter display section of the colorimeter according to the present embodiment.

FIG. 2 is a diagram illustrating the upper surface of the colorimeter 60 on which an operation panel is disposed. As illustrated in FIG. 2, the colorimeter 60 is provided with, for example, a color measurement button 61, a cross key 62, a back key 63, a power button 64, and a colorimeter display section 90. In this regard, FIG. 2 illustrates the case in which an example of a color measurement result is displayed in the colorimeter display section 90. The color measurement button 61 is an operation device for a user to instruct the colorimeter 60 to perform color measurement. For example, the user presses the color measurement button 61 so as to perform color measurement by the color measurement section 100. The cross key 62 is an operation device for instructing, for example, the up, down, left, and right direction, and the like.

In FIG. 2, status information, such as time, a battery remaining amount, and the like are displayed in the uppermost part of the colorimeter display section 90. In an area A1 below the status information, information produced by color measurement is displayed by using an L*a*b* color system. Here, in an L*a*b* color system, L is a numeric parameter denoting brightness. L is a numeric value from 0 to 100, and the higher the value, the brighter. Also, a and b represent a color tone, a is a parameter indicating a change from a reddish to greenish color, and b is a parameter indicating a change from a bluish to yellowish color. When a has the more positive value, the reddish color tone is intensified, whereas when a has the more negative value, the greenish color tone is intensified. Also, when b has the more positive value, the yellowish color tone is intensified, whereas when b has the more negative value, the bluish color tone is intensified. When a and b are both zeros, the result is an achromatic color. A sign ΔE displayed below L, a, and b is a parameter indicating the color difference between the measured color and the color of the color patch to be a reference.

Also, as illustrated in FIG. 2, in the colorimeter display section 90, the measured color is displayed in an shaded area A2 surrounding the area A1 in which the numeric parameters of L, a, and b are displayed. Accordingly, it is possible for the user to visually grasp the measured color in addition to the numeric value information on the measurement result.

Figure 3:
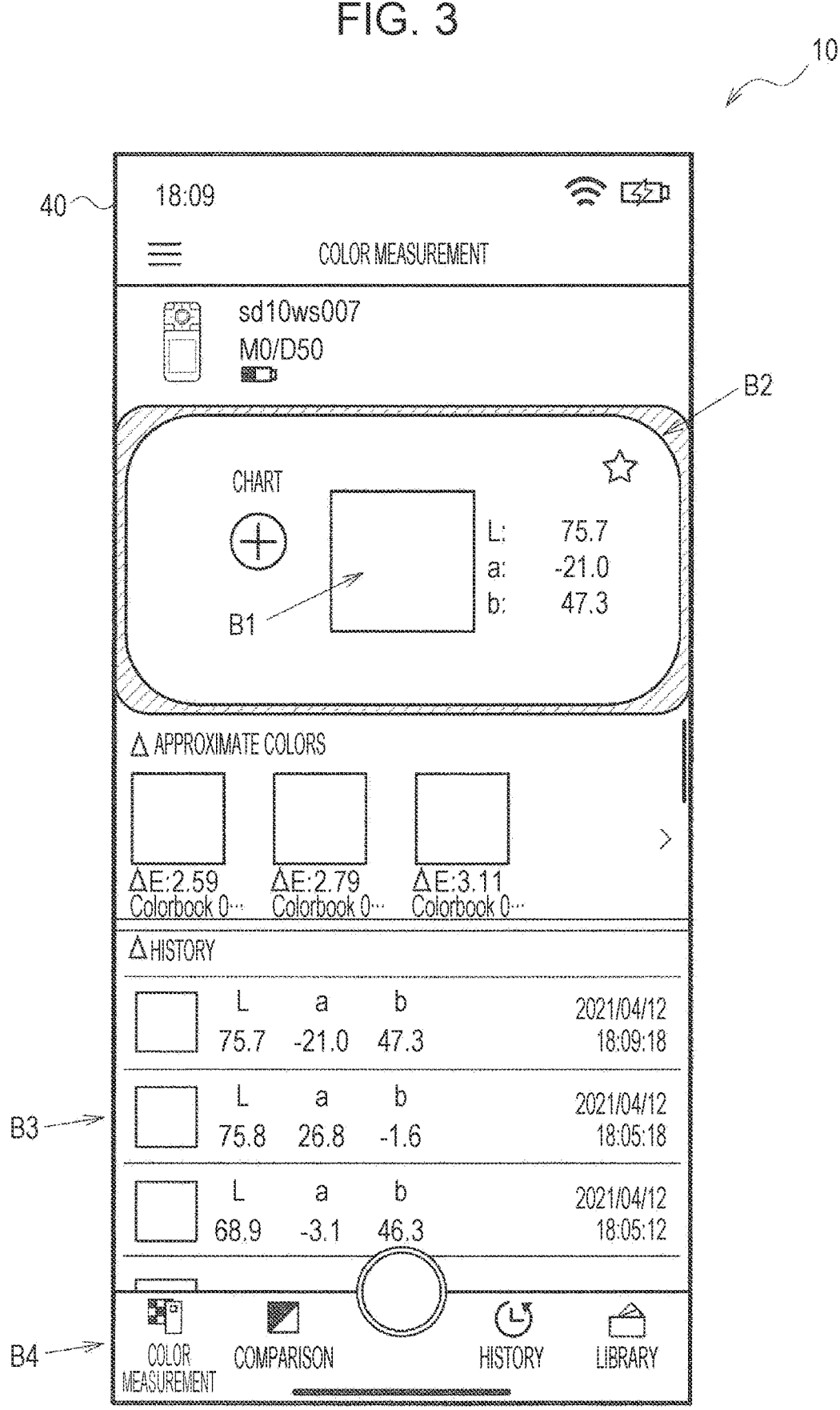
FIG. 3 is a display example of the terminal display section of the terminal device according to the present embodiment.

FIG. 3 is an example of a screen displayed on the terminal display section 40 of the terminal device 10. Specifically, the example is a screen displayed on the terminal display section 40 when the terminal device 10 communicates with the colorimeter 60 and receives information on a color measurement result from the colorimeter 60. Status information, such as time, a battery remaining amount, and the like are displayed in the uppermost part of the screen. Information on the device of the colorimeter 60, which is the communication opposite party, or the like is displayed below that, and indicates that the terminal device 10 is in a communication state with the colorimeter 60. In an area B1 below that, information on the color measured by the colorimeter 60 is also displayed on the terminal display section 40 of the terminal device 10. The numeric parameter values of L, a, and b of the measured color are displayed on the right side of the area B1. Also, the measured color is displayed in the surrounding shaded area B2. Accordingly, it is possible for the user to visually grasp a color measurement result in addition to the numeric parameter values of L, a, and b. Also, for example, the color measurement results of the last three times are displayed in an area B3 below that as measurement history of the colorimeter 60 together with color measurement date and time. In an area B4 located in the bottom row of the screen, icons are displayed in the order left to right, that is to say, an icon corresponding to the color measurement button, an icon corresponding to the comparison button between the color measurement result and the color patch, an icon corresponding to displaying of the history of the color measurement results, and an icon corresponding to the display button of the library information. These icons are images that enable a user to perform a part of the operation to be performed on the colorimeter 60 on the screen of the terminal device 10.

Figure 4:
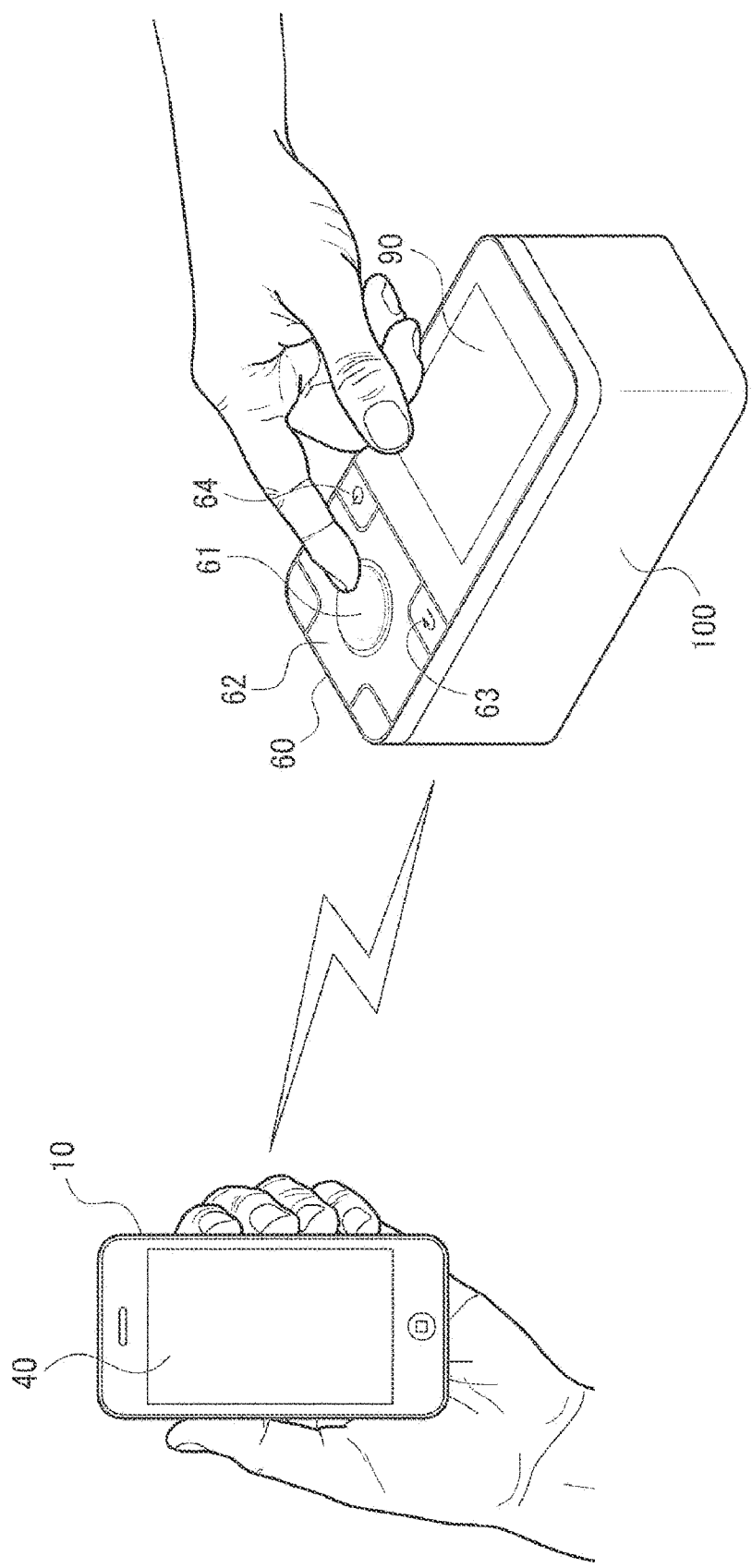
FIG. 4 is an explanatory diagram of the case in which a user performs color measurement by using the terminal device and the colorimeter according to the present embodiment.

FIG. 4 illustrates the state in which a user performs an inspection of color measurement by using the colorimeter 60 and the terminal device 10. In FIG. 4, the user performs color measurement on a color measurement object disposed facing the lower surface of the colorimeter 60 by using the colorimeter 60. The object of the color measurement is a product with a color to be measured, a color chart, or the like. First, the user puts the colorimeter 60 on the color to be measured out of the colors given to the color measurement object, and presses the color measurement button 61 of the colorimeter 60. Then, the information on the color given to the color measurement object is measured by the color measurement section 100 disposed at the bottom of the colorimeter 60, and the color measurement result is displayed on the colorimeter display section 90. Also, it is possible for the user to confirm the color measurement result produced by the colorimeter 60 at the same time in the terminal display section 40 of the terminal device 10 communicating with colorimeter 60 while performing the above-described operation of the colorimeter 60. In this case, the user performs operation on the colorimeter 60 with his/her right hand, and holds the terminal device 10 with his/her left hand. Accordingly, when the user performs color measurement on the color measurement object by using the colorimeter 60 and the terminal device 10, the distance D between the colorimeter 60 and the terminal device 10 is usually about tens of centimeters.

Next, a description will be given of the problems when the user performs color measurement by using the terminal device 10 in addition to the colorimeter 60 in this manner. In the inspection step of the color given to the color measurement object, a color group including a plurality of color patches is usually provided, and color measurement is performed on each of the color patches belonging to the color group in a predetermined order. Then, when the color to be inspected is a predetermined color, it is determined to be normal, whereas when the color is not a predetermined color, it is determined to be abnormal. Accordingly, it is necessary to inspect each of the color patches belonging to a color group without omission, and reliably detect a color that does not meet a color reference so as to maintain the product quality. JP-A-2011-141253 discloses an inspection method using the terminal device 10 together with the colorimeter 60 to meet these needs. In the method, a comparison is made between the color patch determined on the terminal device 10 in advance and the color measured by the colorimeter 60, and when the color difference between the measured color and the corresponding color of the color patch meets the reference value, it is determined to be normal. On the other hand, when the color difference between the measured color and the corresponding color of the color patch does not meet the reference value, it is determined to be abnormal. Then, when it is determined to be abnormal, by displaying warning information with blinking in the part of the color patch determined as the abnormal in the color group displayed on the terminal display section 40 of the terminal device 10, it is possible to reliably detect that the measured color does not meet a predetermined quality. Also, in applying the inspection method disclosed in JP-A-2011-141253, it is possible to display the color measurement result on the colorimeter display section 90 of the colorimeter 60 in addition to the terminal display section 40. In this case, the measured color is sometimes displayed with different color tone on the terminal display section 40 and the colorimeter display section 90. For example, the display device used for the colorimeter display section 90 and the display device used for the terminal display section 40 often have different color resolutions, and the like, and different color reproducibilities, and thus the difference in color tone might occur. When such a difference in color tone occurs, there is a risk that the user might take the color to be measured for a color of another color patch belonging to that color group, and thereby might make wrong operation of the colorimeter 60.

On this point, the terminal device 10 according to the present embodiment, illustrated in FIG. 1, includes the communication section 30 configured to communicate with the colorimeter 60 including the colorimeter display section 90 and the processing section 20 configured to perform display processing on the terminal display section 40, wherein the processing section 20 is configured to perform determination processing as to whether to display a color of a color measurement result produced by the colorimeter 60 both on the colorimeter display section 90 and the terminal display section 40 or only on the terminal display section 40 based on the distance from the colorimeter 60. That is to say, when the distance D between the terminal device 10 and the colorimeter 60 is close, and the user is able to view the display sections of both the terminal device 10 and the colorimeter 60, the processing section 20 does not display the color of the color measurement result to the colorimeter display section 90, but displays the color only to the terminal display section 40. On the other hand, when the distance D between the terminal device 10 and the colorimeter 60 is far, the processing section 20 displays the color of the color measurement result both on the terminal display section 40 and the colorimeter display section 90. In this manner, when the user is able to view the display sections of both the terminal device 10 and the colorimeter 60, it is possible for the user to perform color measurement work by viewing only the color displayed on the terminal display section 40 having a high reproducibility of color, and to avoid mistakenly taking the color by viewing the other of a plurality of display sections having different reproducibilities. On the other hand, when the distance D between the terminal device 10 and the colorimeter 60 is far, the measured color is displayed both on the colorimeter display section 90 and the terminal display section 40, it is possible for the user to perform color measurement work by viewing the colorimeter display section 90 while performing color measurement by using the colorimeter 60. In this case, the user does not view the terminal display section 40, and thus even when the measure color is displayed both on the colorimeter display section 90 and the terminal display section 40 with different color tones, the user might not take the color by mistake. That is to say, by measuring a color by using the terminal device 10 according to the present embodiment, it becomes possible to avoid mistakenly taking a color patch in a color group, and thereby performing wrong color measurement operation on the colorimeter 60.

Also, in the determination processing on the selection of the display status described above, it is possible to set a predetermined distance Dt as a determination reference. The predetermined distance Dt is a distance D with which the user is assumed to be able to perform color measurement while viewing both of the screens of the colorimeter display section 90 and the terminal display section 40. That is to say, it is assumed that the predetermined distance Dt is about tens of centimeters as described above. For example, when the distance D is less than or equal to the predetermined distance Dt, the user is in the state in which the user is able to perform the operation of the colorimeter 60 with one hand and to view the terminal display section 40 of the terminal device 10 held by the other hand while viewing the colorimeter display section 90 of the colorimeter 60 at the same time as described with reference to FIG. 4. In this case, it becomes possible for the user to avoid mistakenly taking a color patch in a color group, and thereby performing wrong color measurement operation on the colorimeter 60 by not displaying the color of the color measurement result on the colorimeter display section 90 and displaying the color only on the terminal display section 40. However, when the distance D is longer than the predetermined distance Dt, it is not possible for the user to view the terminal display section 40 of the terminal device 10 while operating the colorimeter 60. That is to say, as described with reference to FIG. 4, the user is not in the state of holding the terminal device 10 with the other hand while operating the colorimeter 60 with one hand. Accordingly, it is not possible for the user to view the terminal display section 40 of the terminal device 10. Thus, in this case, the user does not mistakenly take a color patch in a color group, or the like even when the color of the color measurement result is displayed both on the colorimeter display section 90 and the terminal display section 40. Accordingly, when the distance D is longer than the predetermined distance Dt, it may be determined to display the color of the color measurement result both on the colorimeter display section 90 and the terminal display section 40.

FIG. 5 is a flowchart illustrating an example of the processing of the terminal device 10 according to the present embodiment. First, in step S1, the processing section 20 of the terminal device 10 determines whether or not the distance D is less than or equal to a predetermined distance Dt. Specifically, the processing section 20 determines whether or not the distance D between the terminal device 10 and the colorimeter 60 is less than or equal to the predetermined distance Dt (step S1). Then, when it is determined that the distance D is less than or equal to the predetermined distance Dt in step S1 (YES), the processing section 20 of the terminal device 10 determines not to display the color of the color measurement result color on the colorimeter display section 90, but to display the color on the terminal display section 40 (step S2). On the other hand, when it is determined that the distance D is longer than the predetermined distance Dt in step S1 (NO), the processing section 20 of the terminal device 10 determines to display the color of the color measurement result both on the colorimeter display section 90 and the terminal display section 40 (step S3). Then, the processing is performed again from step S1 after the processing of step S2 and step S3.

That is to say, when the distance D between the colorimeter 60 and the terminal device 10 is less than or equal to the predetermined distance Dt, it is possible for the processing section 20 not to display the color of the color measurement result on the colorimeter display section 90, and to display the color on the terminal display section 40. Also, when the distance D between the colorimeter 60 and the terminal device 10 is longer than the predetermined distance Dt, it is possible for the processing section 20 to determine to display the color of the color measurement result both on the colorimeter display section 90 and the terminal display section 40. In this manner, it becomes un necessary to perform useless control processing for not displaying the color of the color measurement result on the colorimeter display section 90 even when the user might not mistakenly take a color patch in a color group, and mistakenly perform the color measurement operation of the colorimeter 60. That is to say, it is possible to accurately identify the case in which the user might mistakenly take a color patch, and then to perform control processing that does not display the color of the color measurement result on the colorimeter display section 90.

Also, it is possible to realize the terminal device 10 according to the present embodiment by a program. That is to say, it is possible for the program according to the present embodiment that causes a computer to function as the communication section 30 that communicates with the colorimeter 60 including the colorimeter display section 90 and the processing section 20 that performs the display processing of the terminal display section 40, and the processing section 20 is able to perform determination processing as to whether the color of the color measurement result performed by the colorimeter 60 is displayed both on the colorimeter display section 90 and the terminal display section 40 based on the distance D of the colorimeter 60, or only on the terminal display section 40. Here, the computer is assumed to be a wearable terminal, such as a smartphone, a tablet terminal, a smart watch, or the like, a network terminal, for example, a personal computer, or the like. In this way, it is possible to obtain the same advantages as those described above.

Also, it is possible to realize the terminal device 10 according to the present embodiment as a processing method. That is to say, the method of processing according to the present embodiment makes it possible to perform the communication with the colorimeter 60 including the colorimeter display section 90, the display processing on the terminal display section 40, and the determination processing as to whether the color of the color measurement result produced by the colorimeter 60 is displayed both on the colorimeter display section 90 and the terminal display section 40 or only on the terminal display section 40 based on the distance from the colorimeter 60. In this way, it is possible to obtain the same advantages as those described above.

2. Example of Detailed Processing

Next, a description will be given of an example of the detailed processing according to the present embodiment. In the terminal device 10 according to the present embodiment, it is possible to transmit the result of the determination processing to the colorimeter 60 via the communication section 30 of the terminal device 10. For example, when the distance D between the terminal device 10 and the colorimeter 60 is less than or equal to the predetermined distance Dt, the color of the color measurement result is not displayed on the colorimeter display section 90, and displayed on the terminal display section 40, and thus an instruction to prohibit display of the color of the color measurement result on the colorimeter display section 90 is given to the colorimeter 60. On the other hand, when the distance D is longer than the predetermined distance Dt, the color of the color measurement result is displayed both on the colorimeter display section 90 and the terminal display section 40, and thus an instruction to permit display of the color of the color measurement result on the colorimeter display section 90 is given to the colorimeter 60. In this manner, it is possible to transmit instruction information as to whether display permitted on the colorimeter display section 90 or display prohibited on the colorimeter 60 in accordance with the distance D. Also, it is possible to transmit the instruction information to the colorimeter 60 via the communication section 30 of the terminal device 10.

That is to say, the processing section 20 of the terminal device 10 according to the present embodiment performs determination processing as to whether the color of the color measurement result produced by the colorimeter 60 is displayed both on the colorimeter display section 90 and the terminal display section 40, or only on the terminal display section 40 based on the distance D between the terminal device 10 and the colorimeter 60. The processing section 20 then performs processing for transmitting instruction information on display permitted or display prohibited of the color of the color measurement result on the colorimeter display section 90 to the colorimeter 60 via the communication section 30 based on the determination result. Such instruction information is transmitted so that it is possible for the colorimeter 60 to determine whether display is permitted or display is prohibited based on the instruction information, and to change the display status. For example, when the distance D between the terminal device 10 and the colorimeter 60 is close, and the user is able to view both the colorimeter display section 90 and the terminal display section 40, it is necessary not to display the color measurement result on the terminal display section 40 so as to cause the user not to mistakenly take a color patch in a color group as described above, or the like. In this case, instruction information to prohibit display of the color measurement result on the colorimeter 60 is transmitted from the terminal device 10 to the colorimeter 60, and thus it is possible for the colorimeter 60 not to display the color measurement result on the colorimeter display section 90 based on the instruction information. On the other hand, when the distance D is far, and the user is able to view only the colorimeter display section 90, as described above, even in a case in which the color measurement result is displayed on the terminal display section 40, the user might not mistakenly take a color patch in a color group, or the like. In this case, the terminal device 10 transmits instruction information to display the color measurement result on the colorimeter display section 90 to the colorimeter 60, and thus it is possible for the colorimeter 60 to display the color measurement result on the colorimeter display section 90 based on the instruction information.

Also, as described above, the processing section 20 of the terminal device 10 performs determination processing as to whether to display the color the color of the measurement result both on the colorimeter display section 90 and the terminal display section 40, or display the color only on the terminal display section 40 based on the distance D between the terminal device 10 and the colorimeter 60. The determination result is then transmitted from the communication section 30 of the terminal device 10 to the colorimeter 60 as instruction information. Specifically, the instruction information is transmitted from the communication section 30 of the terminal device 10 to the colorimeter communication section 80 of the colorimeter 60. Then, the display status of the colorimeter display section 90 is changed by the control of the colorimeter processing section 70 based on the instruction information.

In order to perform the determination processing as to whether the color of the color measurement result produced by the colorimeter 60 is displayed both on the colorimeter display section 90 and the terminal display section 40, or is displayed only on the terminal display section 40, it is desirable that the processing section 20 grasp the distance D between the terminal device 10 and the colorimeter 60 all the time. The determination as to whether or not the distance D is less than or equal to a predetermined distance Dt changes fluidly in accordance with the use state of the colorimeter 60 and the terminal device 10 by the user. Here, as a method of grasping the distance D all the time, it is possible to use a determination method of a distance based on the reception signal intensity of a beacon signal. Hereinafter, a description will be given of the determination method.

In general, assuming that the distance between a wireless-signal transmission device and a reception device that receives the wireless signal is d, it is known that the reception signal intensity RSSI (Received Signal Strength Indication) of the wireless signal received by the device at the distance d is inversely proportional to the square of the distance d. Accordingly, assuming that the reception signal intensity RSSI at the position separated from the transmission side device by a reference distance is a reference signal intensity value SIs, the distance d is expressed by Expression (1).

$$d = \sqrt{\frac{SIs}{RSSI}} \quad (1)$$

For example, when the reference signal intensity value SIs is 4 on the assumption that the reference distance is one meter, and the measured reception signal intensity RSSI is 1, the distance d becomes two meters. In this manner, it is possible to obtain a distance d between a transmission side device and a reception side device based on the reference signal intensity value SIs and the reception signal intensity RSSI by calculation.

For determining the distance using such a wireless signal, it is possible to perform the determination by transmitting and receiving a beacon signal including information, for example, the reference signal intensity value SIs described above, or the like between the transmission side device and the reception side device. FIG. 6 is an example of the data structure of a beacon signal. As illustrated in FIG. 6, a beacon signal includes information, such as a transmission source address, identification information of a terminal device, a reference signal intensity value, use history of a device by a user, and the like. A transmission source address is address information representing the transmission source of a beacon signal, for example, a device address of Bluetooth (registered trademark), such as BLE (Bluetooth Low Energy), or the like. Identification information of a device is the information that uniquely identifies a device, which is a transmission source, and for example, a MAC address. A reference signal intensity value SIs is a value of the reception signal intensity RSSI received by the transmission side device located at the position separated by a reference distance as described above, and the information to be used for estimating the distance from the device performing wireless communication. In this regard, a beacon signal may include data not included in the example of the data structure illustrated in FIG. 6, and on the contrary, may not include a part of data illustrated in FIG. 6.

Figure 7:
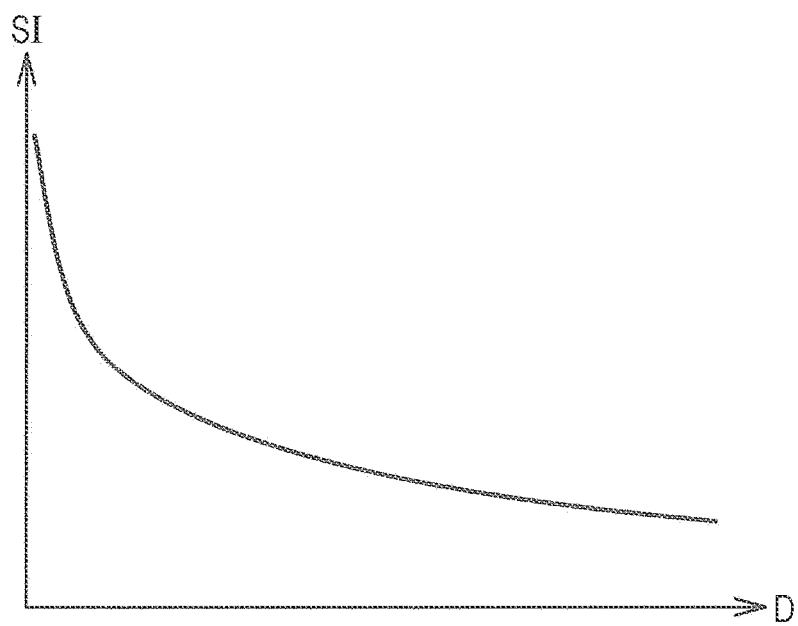
FIG. 7 is an explanatory diagram of the dependency of the intensity of the signal received by the terminal device on the distance between the colorimeter and the terminal device.

FIG. 7 illustrates an example of the dependency of the signal intensity SI received by the terminal device 10 on the distance D based on the above description. That is to say, the signal intensity SI is expressed by Expression (2).

$$SI = \frac{SIs}{D^2} \quad (2)$$

Since the signal intensity SI is inversely proportional to the square of the distance D, the signal intensity SI suddenly decreases when the distance D increases at close range, and gradually decreases as the distance D increases. Accordingly, by using the distance determination method based on the reception signal intensity of the beacon signal, in order to calculate a distance D from a signal intensity SI, it is possible to calculate the distance D by storing a relational expression corresponding to Expression (2) and information on the reference signal intensity value SIs in the storage section 50 of the terminal device 10 and assigning the measured signal intensity SI. Alternatively, the distance D may be obtained by saving the information on Expression (2) as a look-up table in the storage section 50, and extracting suitable data from the look-up table based on the reference signal intensity value SIs and the measured signal intensity SI. The processing section 20 compares the obtained distance D in this manner with a predetermined distance Dt, and thus it is possible to perform determination processing as to whether or not to display the color of the color measurement result on the colorimeter display section 90. In this regard, when a user puts the terminal device 10 in a pocket or a bag, or the like, it is thought that the distance D is determined to be far because the measured signal intensity SI is weak although the actual distance is close. However, in such a case, it is thought that the user does not view the display of the terminal device 10, and thus there is no problem in displaying on the colorimeter 60 on the assumption that the distance D is far. That is to say, the distance D ought to be obtained on the assumption that the terminal device 10 and the colorimeter 60 are in the ideal states.

Figure 8:
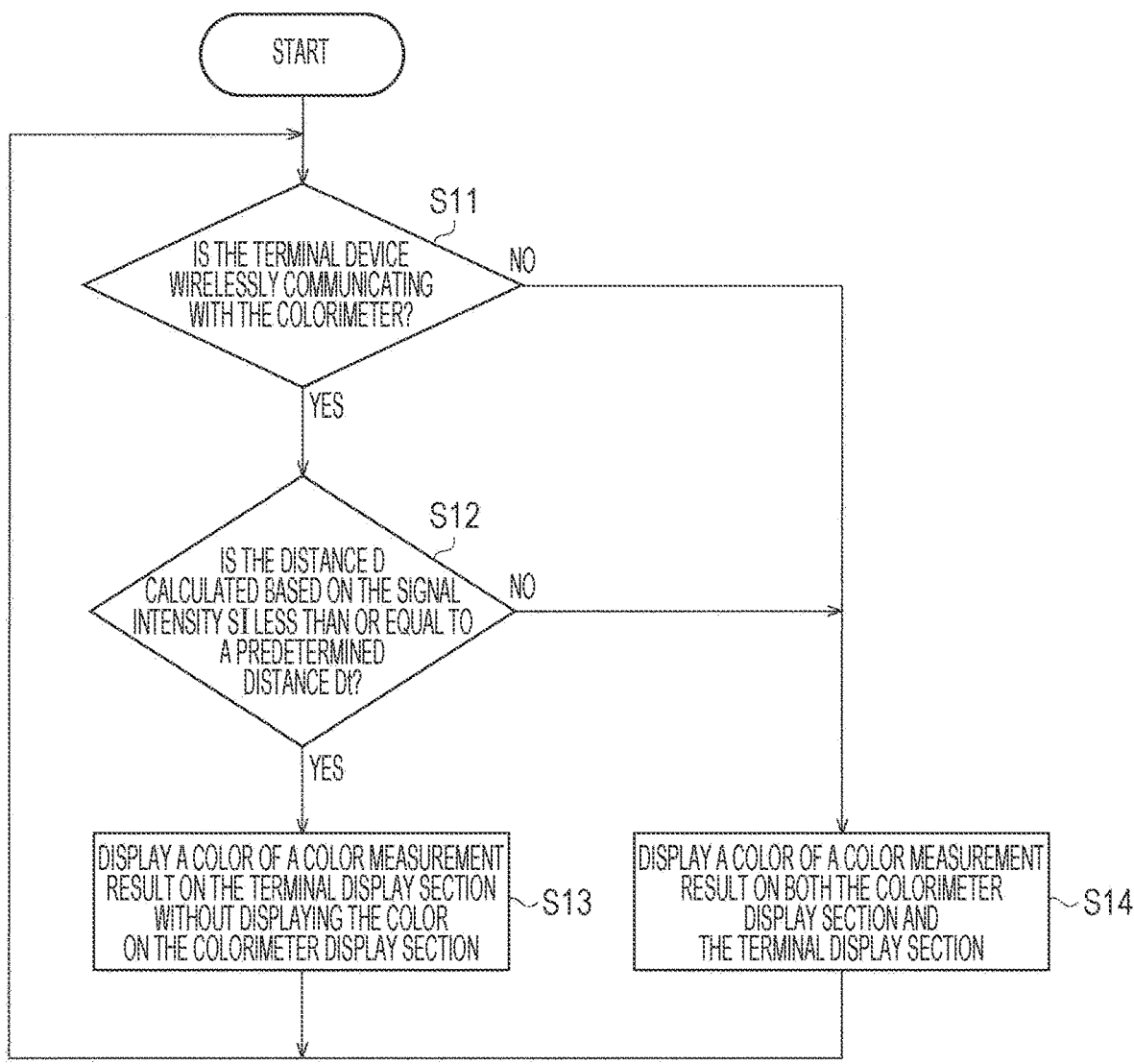
FIG. 8 is a flowchart illustrating an example of the detailed processing according to the present embodiment.

FIG. 8 is a flowchart illustrating an example of the processing in the case in which the distance determination method based on the reception signal intensity of the beacon signal described above is applied to the example of the processing described with reference to FIG. 5. That is to say, in the processing example in FIG. 8, the communication section 30 communicates with the colorimeter 60 by wireless communication, and the processing section 20 determines the distance D between the terminal device 10 and the colorimeter 60 based on the signal intensity SI of wireless communication. First, in step S11, the terminal device 10 determines whether or not wireless communication with the colorimeter 60 is taking place. Specifically, the processing section 20 of the terminal device 10 determines whether or not the communication section 30 is communicating with the colorimeter communication section 80 of the colorimeter 60 by wireless communication (step S11). Specifically, the processing section 20 determines whether or not a wireless communication is established between the communication section 30 and the colorimeter communication section 80. Next, when it is determined that wireless communication is taking place (YES) in step S11, the processing section 20 obtains the distance D by calculation based on the signal intensity SI, and determines whether or not the distance D is less than or equal to a predetermined distance Dt (step S12). Then, when it is determined that the distance D is less than or equal to the predetermined distance Dt in step S12 (YES), the processing section 20 determines to display the color of the measurement result only on the terminal display section 40 without displaying the color on the colorimeter display section 90 (step S13). On the other hand, when the processing section 20 determines that the communication section 30 is not communicating with the colorimeter 60 by wireless communication (NO) in step S11, or when the processing section 20 determines that the distance D is longer than the predetermined distance Dt (NO) in step S12, the processing section 20 determines to display the color of the color measurement result both on the colorimeter display section 90 and the terminal display section 40 (step S14). Then, after step S13 and step S14, the processing is performed again from step S11.

In this manner, it is possible for the processing section 20 of the terminal device 10 to calculate the distance D between the colorimeter 60 and the terminal device 10 based on the signal intensity SI of the wireless signal. Accordingly, when the distance D between the terminal device 10 and the colorimeter 60 changes fluidly depending on the working state of a user, it becomes possible to grasp the distance D all the time. Accordingly, it becomes possible to select the display state suitable for the working state of the user without delay.

Figure 9:
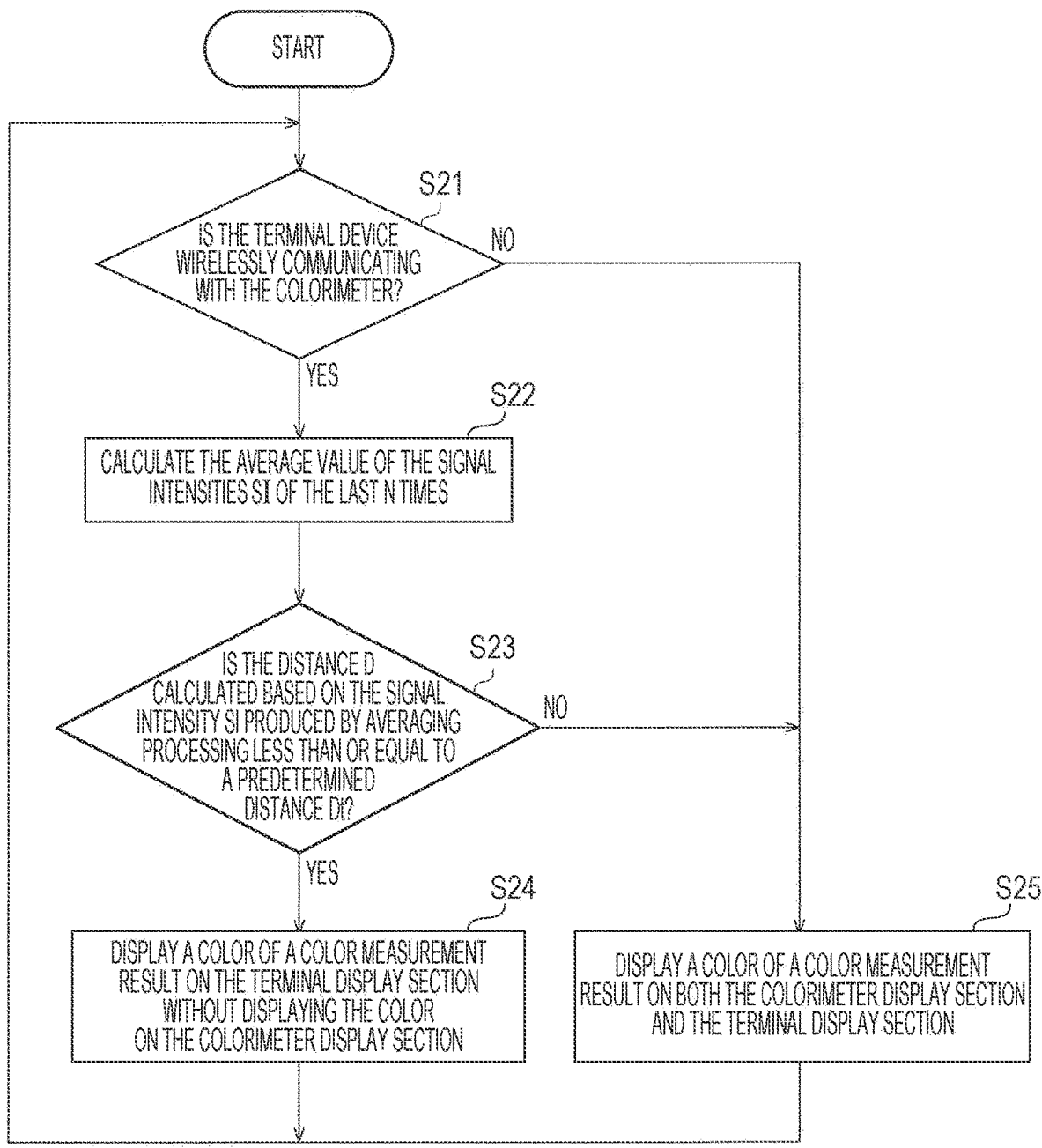
FIG. 9 is a flowchart illustrating an example of the detailed processing according to the present embodiment.

Also, in the case of FIG. 8, the calculation of the distance D may be performed by using the signal intensity SI having been subjected to averaging processing. As described with reference to FIG. 7, the dependency of the signal intensity SI on the distance D is inversely proportional to the square of the distance D. However, in reality, the wireless signals interfere with each other, and thus deviation from Expression (1) becomes larger as the distance between the devices is longer. Accordingly, by calculating the signal intensity SI for a plurality of times and calculating the distance D by using its average value, it is possible to decrease the deviation from Expression (1) caused by the interference between of the wireless signals. FIG. 9 is a flowchart of an example of the processing in this case. The differences from FIG. 8 are as follows. When wireless communication is performed in step S11 of FIG. 8 (YES), in FIG. 9, step S22 of calculating the average value of the signal intensities SI for N times is added. Also, in step S23 of FIG. 9 which corresponds to step S12 of FIG. 8, the difference is that a determination is made as to whether or not the signal intensity SI having been subjected to the averaging processing, instead of the signal intensity SI, is equal to or higher than a predetermined intensity SIt.

Figure 10:
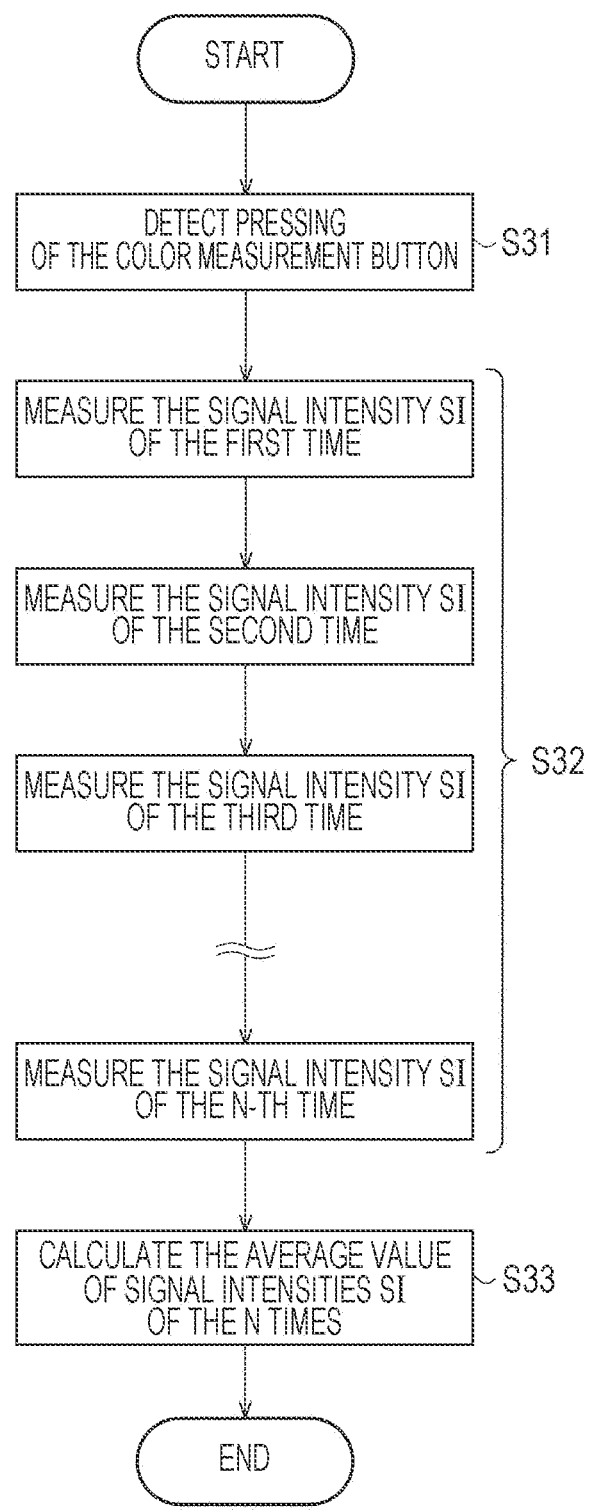
FIG. 10 is a flowchart illustrating the averaging processing of the signal intensities according to the present embodiment.

Here, as a method of averaging processing the signal intensity SI, it is possible to use, for example, a flowchart illustrated in FIG. 10. First, after the processing section 20 detects pressing on the color measurement button 61 by a user (step S31), the colorimeter 60 measures the signal intensity SI for a predetermined number of times (step S32). In FIG. 10, the predetermined number of times is set to N times. N is an integer of 2 or more. The processing section 20 then performs averaging processing on the data of the signal intensities SI for N times, and calculates the average value of the signal intensity SI (step S33). That is to say, in the averaging method illustrated in FIG. 10, the processing section 20 is not measuring the signal intensity SI of the wireless signal all the time, and when the processing section 20 detects that a user pressed the color measurement button 61 of the colorimeter 60, the processing section 20 measures the signal intensity SI.

Figure 11:
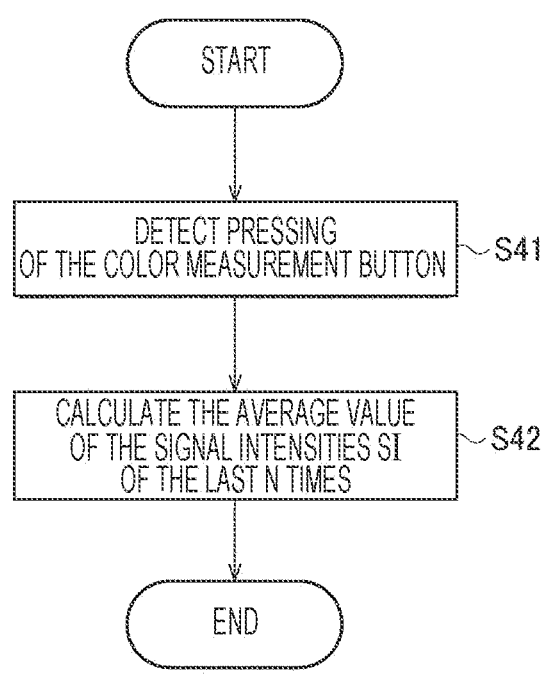
FIG. 11 is a flowchart illustrating the averaging processing of the signal intensities according to the present embodiment.

On the other hand, an averaging processing method illustrated in FIG. 11 is devised on the assumption that the terminal device 10 periodically measures the signal intensity SI of the wireless signal. First, in the same manner as the case in FIG. 10, the processing section 20 detects that a user pressed the color measurement button 61 of the colorimeter 60 (step S41). Next, in the method in FIG. 11, the average value of the signal intensities SI for the last N times is calculated (step S42). That is to say, the processing section 20 refers to the data of the signal intensities SI for N times of measurements until detecting pressing of the color measurement button 61, and performs averaging processing. Here, the method of the averaging processing illustrated in FIG. 10 has advantages in that the processing section 20 does not periodically measure the signal intensity SI in the background, and thus the control processing load of the processing section 20 is advantageously light. On the other hand, in the method of the averaging processing illustrated in FIG. 10, the processing section 20 measures the signal intensities SI for N times from when the processing section 20 detects pressing of the color measurement button 61 and performs the averaging processing. Accordingly, the method has disadvantages in that a time lag occurs from when the user has pressed the color measurement button 61 to when the instruction information of display permitted or display prohibited of the color of the color measurement result on the colorimeter display section 90 is transmitted. On this point, in the averaging processing method illustrated in FIG. 11, the processing section 20 periodically measures signal intensity SI in the background, and thus the averaging processing method has disadvantages in that the control processing load of the processing section 20 increases. However, since the processing section 20 periodically measures the signal intensity SI in the background, less time lag occurs from the time when the user has pressed the color measurement button to the time when the instruction information of display permitted or display prohibited of the color of the color measurement result on the colorimeter display section 90 is transmitted, it is possible to select the display state suitable for the working state of the user. In this regard, the averaging processing may be performed by using any one of arithmetic average, geometric average, and harmonic average. Also, the median of the data of the signal intensities SI for N times may be used instead of the signal intensity SI having been subjected to the averaging processing. That is to say, in the terminal device 10 according to the present embodiment, the processing section 20 performs the averaging processing on the signal intensities SI and determines the distance D from the colorimeter 60. In this manner, it is possible to reduce problems, such as an error caused by the interference of the wireless signals, or the like when the distance D is calculated based on the signal intensity SI, and thus to reliably realize the display state suitable for the working state of the user.

Figure 12:
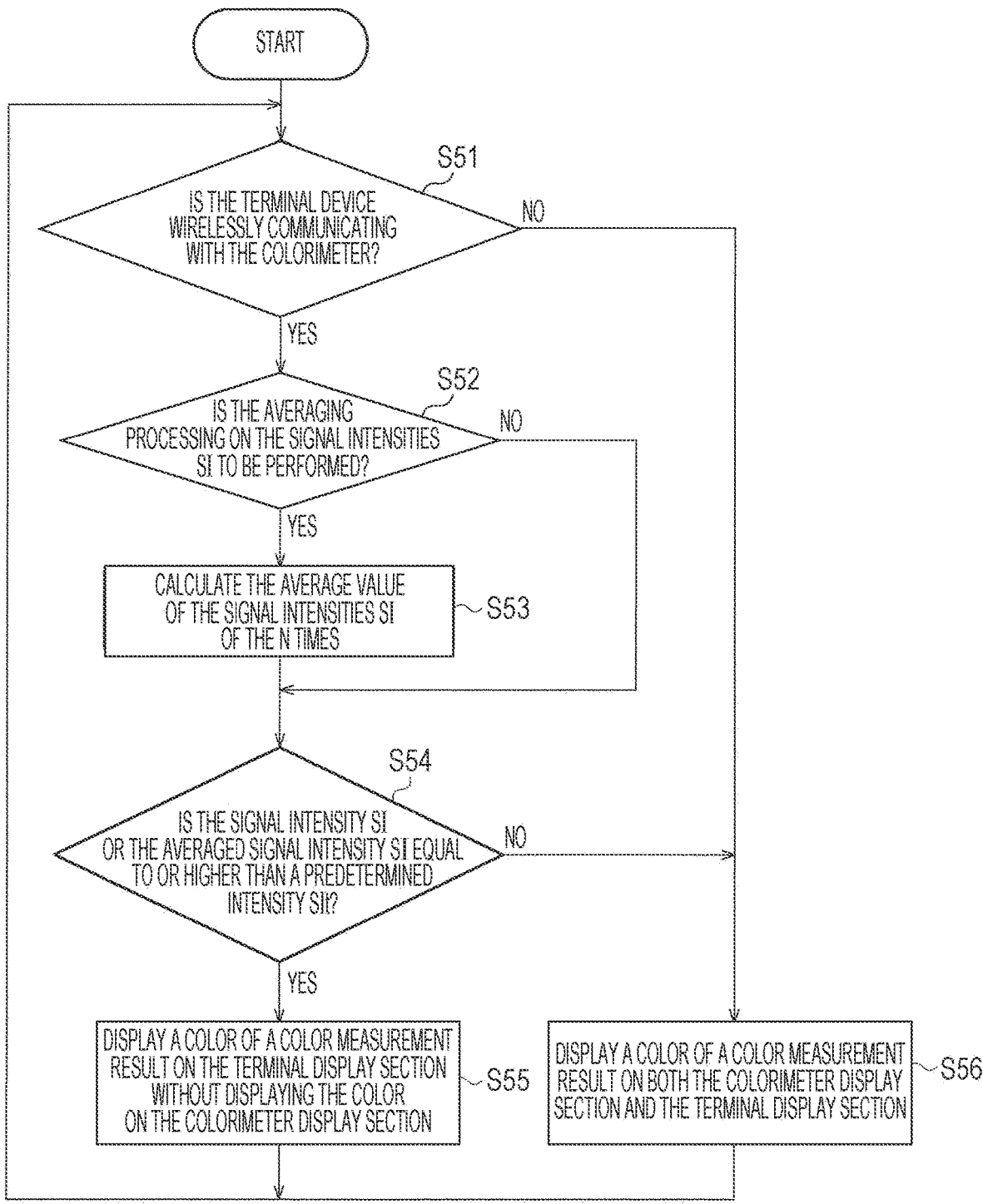
FIG. 12 is a flowchart illustrating an example of the detailed processing according to the present embodiment.

Also, in the example of the processing illustrated in FIG. 8 and FIG. 9, it is possible to determine whether or not the distance D is equal to or longer than a predetermined distance Dt by the determination as to whether or not the signal intensity SI is equal to or higher than a predetermined intensity SIt. That is to say, when the measured signal intensity SI or the signal intensity SI having been subjected to the averaging processing is equal to or higher than a predetermined intensity SIt, it is possible for the processing section 20 to determine that the distance D is less than or equal to a predetermined distance Dt. Then, in this case, it is possible for the processing section 20 not to display the color of the color measurement result on the colorimeter display section 90, and to display the color only on the terminal display section 40. On the contrary, when the measured signal intensity SI or the signal intensity SI having been subjected to the averaging processing is less than the predetermined intensity SIt, it is possible for the processing section 20 to determine that the distance D is longer than a predetermined distance Dt. Then, in this case, it is possible for the processing section 20 to determine to display the color of the color measurement result both on the display section 90 and the terminal display section 40. FIG. 12 is a flowchart illustrating an example of the processing in this case. The different point from FIG. 8 and FIG. 9 is step S54, which is corresponding to step S12 in FIG. 8 and step S23 in FIG. 9. In step S54 in FIG. 12, the processing section 20 does not determine whether or not the distance D is less than or equal to a predetermined distance Dt, but determines to proceed to either step S55 or step S56 by the determination as to whether or not the signal intensity SI or the signal intensity SI having been subjected to the averaging processing is equal to or higher than a predetermined intensity SIt. It is possible to realize the above determination processing by storing the signal intensity SI when the distance D between the terminal device 10 and the colorimeter 60 becomes a predetermined distance Dt, for example, in the storage section 50 of the terminal device 10 as a predetermined intensity SIt, and by comparing the measured signal intensity SI with a predetermined intensity SIt. In the determination processing, the signal intensity SI is directly compared with the predetermined intensity SIt so that it is possible to determine whether display permitted or display prohibited of the color of the color measurement result on the colorimeter display section 90 without calculating the distance D based on the signal intensity SI and by comparing the distance D with a predetermined distance Dt. Accordingly, it is possible to simplify and speeding up the control processing performed by the processing section 20.

Also, in processing examples illustrated in FIG. 5, FIG. 8, FIG. 9, and FIG. 12, each processing may be started when the user presses the color button 61 of the colorimeter 60. That is to say, in the terminal device 10 according to the present embodiment, it is possible for the processing section 20 to perform determination processing as to whether to display the color of the color measurement result produced by the colorimeter 60 both on the colorimeter display section 90 and the terminal display section 40, or to display only on the terminal display section 40 based on the distance D between the terminal device 10 and the colorimeter 60 when an instruction operation of the color measurement is performed by the colorimeter 60.

In this manner, only when the user gives an instruction to perform color measurement, the processing section 20 of the terminal device 10 performs the determination processing as to whether to display the color of the color measurement result described above on colorimeter display section 90. Accordingly, when the user has not instructed to perform the color measurement, it becomes unnecessary to perform the determination processing described above, and thus it is possible to reduce the load of the control processing performed by the processing section 20.

As described above, when a color measurement result is displayed both on the terminal display section 40 of the terminal device 10 and the colorimeter display section 90 of the colorimeter 60, the user might mistakenly take the color targeted for the color measurement for a color of another color patch due to the difference in the color reproducibilities of the terminal display section 40 and the colorimeter display section 90, or the like.

On this point, the colorimeter 60 according to the present embodiment includes the color measurement section 100 that performs color measurement, the colorimeter communication section 80 that performs communication with the terminal device 10, the colorimeter display section 90, and the colorimeter processing section 70 that performs display processing on the colorimeter display section 90, wherein when a communication with the terminal device 10 is not established by the colorimeter communication section 80, the colorimeter processing section 70 performs the processing for displaying the color of the color measurement result produced by the color measurement section 100 on the colorimeter display section 90, whereas when a communication with the terminal device 10 by the colorimeter communication section 80 is established, the colorimeter processing section 70 determines whether or not to display the color of the color measurement result based on the instruction information of display prohibited or display permitted from the terminal device 10 on the colorimeter display section 90. Here, the colorimeter communication section 80, the colorimeter display section 90, the colorimeter processing section 70, and the color measurement section 100 are the same as those described with reference to FIG. 1. In the colorimeter 60 according to the present embodiment, first, the colorimeter processing section 70 of the colorimeter 60 determines whether or not a communication between the colorimeter communication section 80 and the communication section 30 of the terminal device 10 is established. When the communication is not established, it is not possible for the colorimeter 60 to transmit a color measurement result to the terminal device 10. Accordingly, the color measurement result is not transmitted from the colorimeter 60 to the terminal device 10, and the colorimeter processing section 70 of the colorimeter 60 performs processing for displaying the color measurement result on the colorimeter display section 90. That is to say, when a communication between the colorimeter 60 and the terminal device 10 is not established, the color measurement result is displayed only on the colorimeter display section 90. Here, in the state in which a communication between the colorimeter communication section 80 and the terminal device 10 is not established, the distance D between the colorimeter 60 and the terminal device 10 is far, and the user is able to view the colorimeter display section 90 of the colorimeter 60, but not able to view the terminal display section 40 of the terminal device 10, and thus no inconvenience occurs even when the color measurement result is not displayed on the terminal display section 40 of the terminal device 10. On the other hand, when the communication is established, the colorimeter processing section 70 of the colorimeter 60 determines whether or not to display the color of the color measurement result on the colorimeter display section 90 based on the instruction information of display prohibited or display permitted from the terminal device 10. In this case, as described above, when the distance D is close, the terminal device 10 transmits the instruction information of display prohibited, whereas when the distance D is far, the terminal device 10 transmits the information of display permitted. First, the colorimeter 60 receives the instruction information, and when the instruction information is display prohibited, the colorimeter 60 does not display the color measurement result on the colorimeter display section 90. Specifically, the colorimeter communication section 80 of the colorimeter 60 receives the instruction information, and the colorimeter processing section 70 performs the control processing for not displaying the color measurement result on the colorimeter display section 90 based on the instruction information. Accordingly, when the distance D between the colorimeter 60 and the terminal device 10 is close, the color measurement result is displayed only on the terminal display section 40 of the terminal device 10 having excellent color reproducibility. Accordingly, it becomes possible for the user to avoid mistakenly taking the measured color for a color in another color patch, which is caused by the difference in color tone of the color measurement result displayed between the colorimeter display section 90 and the terminal display section 40. Also, when the instruction information is display permitted, the colorimeter communication section 80 of the colorimeter 60 displays the color measurement result on the colorimeter display section 90. Specifically, the colorimeter communication section 80 of the colorimeter 60 receives the instruction information, and the colorimeter processing section 70 performs control processing for displaying the color measurement result on the colorimeter display section 90 based on the instruction information. Accordingly, when the distance D between the colorimeter 60 and the terminal device 10 is far, the color measurement result is displayed both on the colorimeter display section 90 of the colorimeter 60 and the terminal display section 40 of the terminal device 10. In this case, since the distance D is far, the user is in the state of performing color measurement by viewing only the colorimeter display section 90 of the colorimeter 60, it is possible for the user to perform color measurement by viewing the color measurement result displayed on the colorimeter display section 90. In this manner, it is possible to select a suitable display state of the color measurement result in accordance with the distance D between the colorimeter 60 and the terminal device 10. Accordingly, it becomes possible for the user to avoid mistakenly taking the color to be measured for a color in another color patch, and thereby performing a mistaken color measurement operation, which is caused by displaying of the color measurement target color with different color tone between the terminal device 10 and the colorimeter 60.

Also, in the colorimeter 60 according to the present embodiment, it is possible to display the color of the color measurement in the area A2 of the colorimeter display section 90 as described with reference to FIG. 2. That is to say, it is possible to display the color of the color measurement result so as to surround the area A1 in which the information on L, a, b, or the like is displayed in the colorimeter display section 90. The colorimeter display section 90 of the colorimeter 60 often has a narrow display area in comparison with the terminal display section 40 of the terminal device 10. Accordingly, it is difficult for the colorimeter display section 90 to have a sufficient space to display the color of the color measurement in addition to the display of the numeric parameters on the color of the color measurement, such as L, a, b, or the like. Accordingly, in the same manner as the present embodiment, it is possible to provide the user with more information by effectively using the limited display area of the colorimeter display section 90. Also, as a result, it becomes possible for the user to visually grasp the color tone of the color measurement result with the numeric parameter information, and thus to avoid mistakenly taking the color to be measured for a color in another color patch and wrong color measurement operation of the colorimeter 60.

As described above, the terminal device according to the present embodiment includes a communication section configured to communicate with the colorimeter including the colorimeter display section and a processing section configured to perform the display processing of the terminal display section, wherein the processing section performs determination processing as to whether to display the color of the color measurement result both on the colorimeter display section and the terminal display section or only on the terminal display section based on the distance from the colorimeter.

With the present embodiment, when the user is able to view the display sections of both the terminal device and the colorimeter, it is possible for the user to perform color measurement by viewing only the terminal display section having excellent color reproducibility. Accordingly, it becomes possible for the user to avoid mistakenly taking the color to be measured for a color in another color patch, which is caused by the difference in color tone of the color measurement result displayed on the plurality of display sections, and thereby performing a mistaken color measurement operation.

Also, in the terminal device according to the present embodiment, when the distance from the colorimeter is less than or equal to a predetermined distance, the processing section may determine to display the color of the color measurement result on the terminal display section without displaying the color on the colorimeter display section.

In this manner, it becomes unnecessary to perform useless control processing for not displaying the color of the color measurement result on the colorimeter display section when there is no risk of mistakenly taking the color to be measured by the user, and performing wrong color measurement operation on the colorimeter.

Also, in the terminal device according to the present embodiment, when the distance from the colorimeter is longer than a predetermined distance, it may be determined that the color of the color measurement result is displayed both on the colorimeter display section and the terminal display section.

In this manner, when the distance between the colorimeter and the terminal device is far, and thus it is necessary to display the color of the color measurement result both on the colorimeter display section and the terminal display section, the color of the color measurement result is displayed on both display sections. It is therefore possible to avoid the situation in which the user is not able to confirm the color measurement result on the colorimeter display section.

Also, in the terminal device according to the present embodiment, the processing section may perform the processing for transmitting instruction information of display permitted or display prohibited of the color of the color measurement result on the colorimeter display section to the colorimeter via the communication section based on the determination processing result.

In this manner, it is possible for the colorimeter to determine whether or not to display the measurement result on the colorimeter display section based on the instruction information transmitted from the terminal device.

Also, in the terminal device according to the present embodiment, the communication section communicates with the colorimeter by wireless communication, and the processing section may determine the distance from the colorimeter based on the signal intensity of the wireless communication.

In this manner, the processing section of the terminal device is able to calculate the distance between the colorimeter and the terminal device based on the signal intensity of the wireless signal, and thus it becomes possible to always grasp the distance that changes fluidly, and to select the display state suitable for the working state of the user without delay.

Also, in the terminal device according to the present embodiment, the processing section may perform averaging processing on the signal intensity to determine the distance from the colorimeter.

In this manner, when the distance is calculated based on the signal intensity, it is possible to avoid the problems due to the interference between the wireless signals, and to reliably realize the display state suitable for the working state of a user.

Also, in the terminal device according to the present embodiment, when the signal intensity is equal to or higher than a predetermined intensity, the processing section may determine to display the color of the color measurement result on the terminal display section without displaying the color on the colorimeter display section.

In this manner, it is possible to simplify and speed up the control processing performed by the processing section.

Also, in the terminal device according to the present embodiment, when the signal intensity is less than a predetermined intensity, the processing section may determine to display the color of the color measurement result both on the colorimeter display section and the terminal display section.

In this manner, when there is no risk of performing of wrong color measurement operation on the colorimeter by a user, it is possible to display the color of the color measurement result both on the colorimeter display section and the terminal display section.

Also, in the terminal device according to the present embodiment, the processing section may perform the determination processing based on the distance from the colorimeter when instruction operation of color measurement by the colorimeter is performed.

In this manner, when an instruction to perform color measurement is not given from a user, it becomes unnecessary to determine whether or not to display the color of the color measurement result on the colorimeter display section, and thus to reduce the load of the control processing performed by the processing section.

According to another embodiment of the present embodiment, there is provided a colorimeter including: a color measurement section configured to perform color measurement; a colorimeter communication section configured to communicate with a terminal device; a colorimeter display section; and a colorimeter processing section configured to perform display processing of the colorimeter display section, wherein when communication between the colorimeter communication section and the terminal device is not established, the colorimeter processing section displays a color of a measurement result on the colorimeter display section, whereas when communication between the colorimeter communication section and the terminal device is established, the colorimeter processing section determines whether or not to display the color of the measurement result on the colorimeter display section based on the instruction information of display prohibited or display permitted from the terminal device.

With the present embodiment, when the colorimeter is located within the distance communicatable with the terminal device and the user is able to view the display section of both the terminal device and the colorimeter, it is possible for the user to perform color measurement by only viewing the color displayed on the terminal display section having excellent color reproducibility. Accordingly, it becomes possible for the user to avoid mistakenly taking the color to be measured for a color in another color patch in the color group, which is caused by the difference in color tone of the color measurement result displayed on the plurality of display sections, and thereby performing mistaken color measurement operation.

In this manner, it is possible to select the suitable display state of the color measurement result in accordance with the distance between the colorimeter and the terminal device. Accordingly, it becomes possible for the user to avoid mistakenly taking the color to be measured for a color in another color patch, which is caused by the difference in color tone of the color measurement result displayed on the plurality of display sections, and thereby performing a mistaken color measurement operation.

Also, in the colorimeter according to the present embodiment, the colorimeter processing section may perform processing for displaying the color of the color measurement result so as to surround a display area of a numeric value of the color measurement result on the colorimeter display section.

In this manner, it is possible to provide the user with more information by effectively using the limited display area of the colorimeter display section. Also, it becomes possible for the user to visually grasp the color tone of the color measurement result with the numeric parameter information, and thus to avoid mistakenly taking the color to be measured for a color in another color patch and wrong color measurement operation of the colorimeter.

According to another aspect of the present embodiment, there is provided a non-transitory computer-readable storage medium storing a program, the program causing a computer to perform functions including: a communication section configured to communicate with a colorimeter including a colorimeter display section; and a processing section configured to perform display processing on a terminal display section, wherein the processing section performs determination as to whether a color of a color measurement result produced by the colorimeter is displayed both on the colorimeter display section and the terminal display section or only on the terminal display section based on a distance from the colorimeter.

According to another aspect of the present embodiment, there is provided a processing method including communicating with a colorimeter including a colorimeter display section; displaying on a terminal display section; and determining whether to display a color of a color measurement result produced by the colorimeter both on the colorimeter display section and the terminal display section or only on the terminal display section based on a distance from the colorimeter.

In this regard, the detailed description has been given of the present embodiment as described above. However, it will be easily understood for those skilled in the art that various variations are possible without substantially departing from the new matter and advantages of the present disclosure. Accordingly, such variations are considered to be all included in the scope of the present disclosure. For example, it is possible to replace the term described with a different term in a broader sense or different synonym in the specification or the drawings at least once with a different term in any part of the specification or the drawings. Also, all the combinations of the present embodiment and variations are all included in the scope of the present disclosure. Also, the configuration and the operation, and the like of the terminal device, the colorimeter, the program, and the method of processing are not limited to those described in the present embodiment, and various variations are possible. For example, either the terminal device or the colorimeter may determine whether the color of the color measurement result produced by the colorimeter is displayed both on the colorimeter display section and the terminal display section, or only on the terminal display section. Alternatively, the determination may be made by neither device. Also, the distance D between the terminal device 10 and the colorimeter 60 may be determined by any method other than using the signal intensity. For example, the distance D may be determined by the time required until a sound produced from one of the terminal device 10 and the colorimeter 60 reaches the other. Further, a determination may be made by any other method. The determination may be made based on a parameter that is thought to be dependent on the signal intensity value, or the like without actually calculating the distance.

What is claimed is:

1. A terminal device comprising:
   a communication section configured to communicate with a colorimeter including a colorimeter display section; and a processing section configured to perform display processing on a terminal display section, wherein the processing section performs determination processing as to whether to display a color of a color measurement result produced by the colorimeter both on the colorimeter display section and the terminal display section or display the color only on the terminal display section based on a distance from the colorimeter.

2. The terminal device according to claim 1, wherein when a distance from the colorimeter is less than or equal to a predetermined distance, the processing section determines to display the color of the color measurement result on the terminal display section without displaying the color on the colorimeter display section.

3. The terminal device according to claim 2, wherein when a distance from the colorimeter is longer than the predetermined distance, the processing section determines to display the color of the color measurement result both on the colorimeter display section and the terminal display section.

4. The terminal device according to claim 1, wherein the processing section performs processing for transmitting instruction information on display permitted or display prohibited of the color of the color measurement result to the colorimeter via the communication section based on a result of the determination processing.

5. The terminal device according to claim 1, wherein the communication section communicates with the colorimeter by wireless communication, and the processing section determines the distance from the colorimeter based on a signal intensity of the wireless communication.

6. The terminal device according to claim 5, wherein the processing section determines the distance from the colorimeter by performing averaging processing of the signal intensity.

7. The terminal device according to claim 5, wherein when the signal intensity is equal to or higher than a predetermined intensity, the processing section determines to display the color of the color measurement result on the terminal display section without displaying the color on the colorimeter display section.

8. The terminal device according to claim 7, wherein when the signal intensity is less than the predetermined intensity, the processing section determines to display the color of the color measurement result both on the colorimeter display section and the terminal display section.

9. The terminal device according to claim 1, wherein the processing section performs the determination processing based on a distance from the colorimeter when an instruction operation for color measurement is performed by the colorimeter performs.

10. A colorimeter comprising:

a color measurement section configured to perform color measurement;

a colorimeter communication section configured to communicate with a terminal device;

a colorimeter display section; and a colorimeter processing section configured to perform display processing on the colorimeter display section, wherein in a first case in which the terminal device communicating therewith is located close to the colorimeter the colorimeter processing section does not display a color measurement result on the colorimeter display section, whereas in a second case in which the terminal device communicating therewith is located far from the colorimeter, the colorimeter processing section displays the color measurement result on the colorimeter display section.

11. The colorimeter according to claim 10, wherein when communication between the colorimeter communication section and the terminal device is not established, the colorimeter processing section displays the color measurement result on the colorimeter display section.

12. The colorimeter according to claim 10, wherein a determination of either the first case or the second case is made based on instruction information on display prohibited or display permitted from the terminal device.

13. The colorimeter according to claim 10, wherein the colorimeter processing section performs processing for displaying the color of the color measurement result so as to surround a display area of a numeric value of the color measurement result on the colorimeter display section.

14. A non-transitory computer-readable storage medium storing a program, the program causing a computer to perform functions comprising:

a communication section configured to communicate with a colorimeter including a colorimeter display section; and a processing section configured to perform display processing on a terminal display section, wherein the processing section performs determination processing as to whether to display a color of a color measurement result produced by the colorimeter both on the colorimeter display section and the terminal display section or display the color only on the terminal display section based on a distance from the colorimeter.

* * * * *